Figure 1:
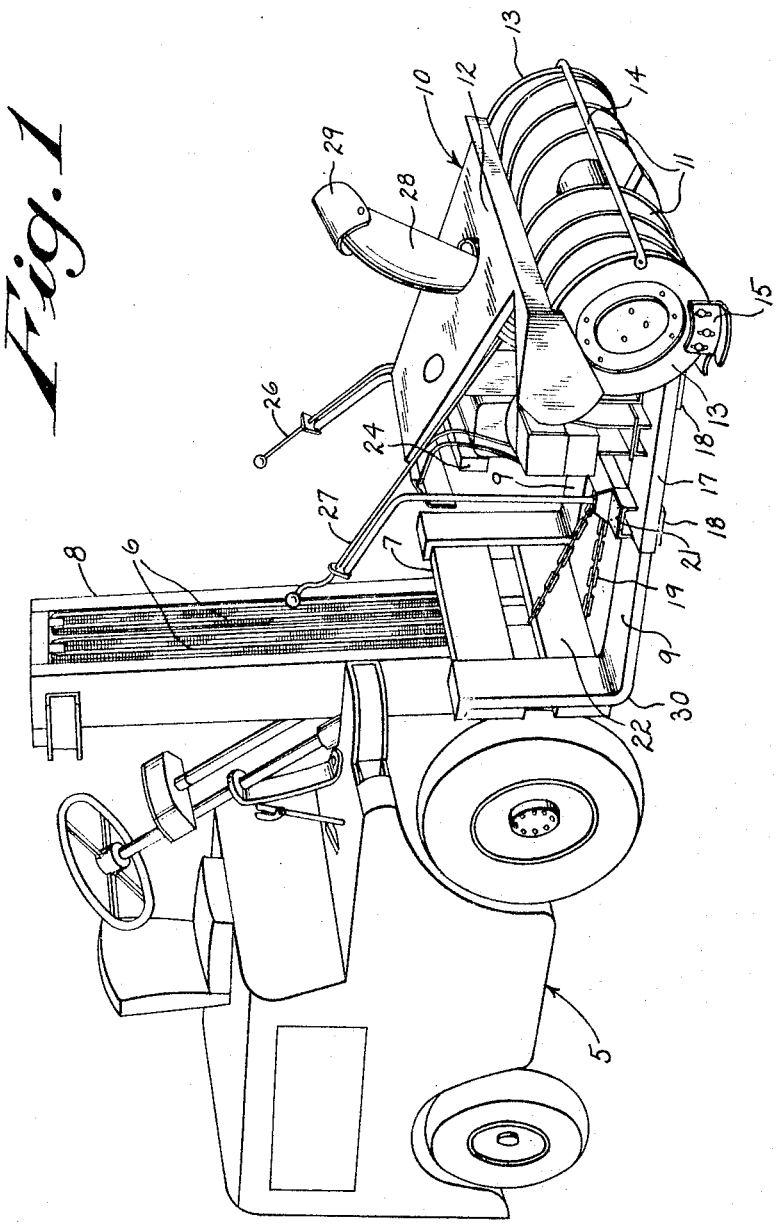

May 23, 1967  J. HABAN  3,320,688
SNOW THROWER AND FORK LIFT TRUCK ASSEMBLAGES
Filed Nov. 29, 1963  2 Sheets-Sheet 2

INVENTOR
JOSEPH HABAN

BY
*Morsell & Morsell*
ATTORNEYS

United States Patent Office 3,320,688
Patented May 23, 1967

3,320,688
SNOW THROWER AND FORK LIFT TRUCK
ASSEMBLAGES
Joseph Haban, Mound and Marquette Sts.,
Racine, Wis. 53404
Filed Nov. 29, 1963, Ser. No. 326,888
7 Claims. (Cl. 37—43)

This invention relates to improvements in snow thrower and fork lift truck assemblages.

Motorized, wheeled snow throwers have become very popular for removing snow from driveways, walks, paths, parking areas, etc., but customarily such snow throwers are either arranged to be self-propelled or to be hitched to and driven by various types of small tractors. With respect to the latter, the connections between the snow throwers and the motivating tractors are complex and are inconvenient and time-consuming to effect.

Most industrial establishments, such as factories and the like, have standard fork lift trucks for engaging, lifting and transporting pallet-mounted loads. It is, therefore, a primary object of the present invention to provide a snow thrower so constructed that it may be very rapidly and easily engaged or disengaged relative to the forks of a standard fork lift truck, whereby the motorized fork lift truck will serve as the means for propelling the snow thrower.

Standard fork lift trucks are provided with masts which vertically movably carry the forks, which masts are susceptible of being tilted from vertical and on which the forks may be moved vertically. Accordingly, in the present invention the improved snow thrower-fork lift truck assemblage is such that the normal operation of the lift fork and tilting of the mast is effective to adjust the disposition of the attached snow thrower relative to the surface being traversed for snow removal purposes.

A further object of the invention is to provide a snow thrower and fork lift truck assemblage wherein the snow thrower is provided with a rearwardly-projecting skid frame which includes a pair of laterally-spaced-apart, channeled arms into which the horizontal fork portions of the fork lift truck are easily and quickly, telescopically engaged to provide the connection between the snow thrower and truck units.

A further object of the invention is to provide, in a snow blower and fork lift truck assemblage, means for effecting quick operative engagement of the truck lift arms with portions of the snow blower, together with means for releasably anchoring said parts in their engaged condition.

A further object of the invention is to provide a snow thrower and fork lift truck assemblage which will permit use of the fork lift truck for its normal functions, independent of the snow blower, and which will permit quick association of the standard fork lift truck with the snow thrower for snow removing purposes.

A further object of the invention is to provide a snow thrower and fork lift truck assemblage which requires no modification in the structure of the fork lift truck, which is extremely simple and convenient to use and operate, which is relatively inexpensive, which is adjustable and versatile, and which is well adapted for the purposes described.

With the above and other objects in view the invention consists of the improved snow thrower and fork lift truck assemblage, and its parts and combinations as set forth in the claims and all equivalents thereof.

Figure 2:
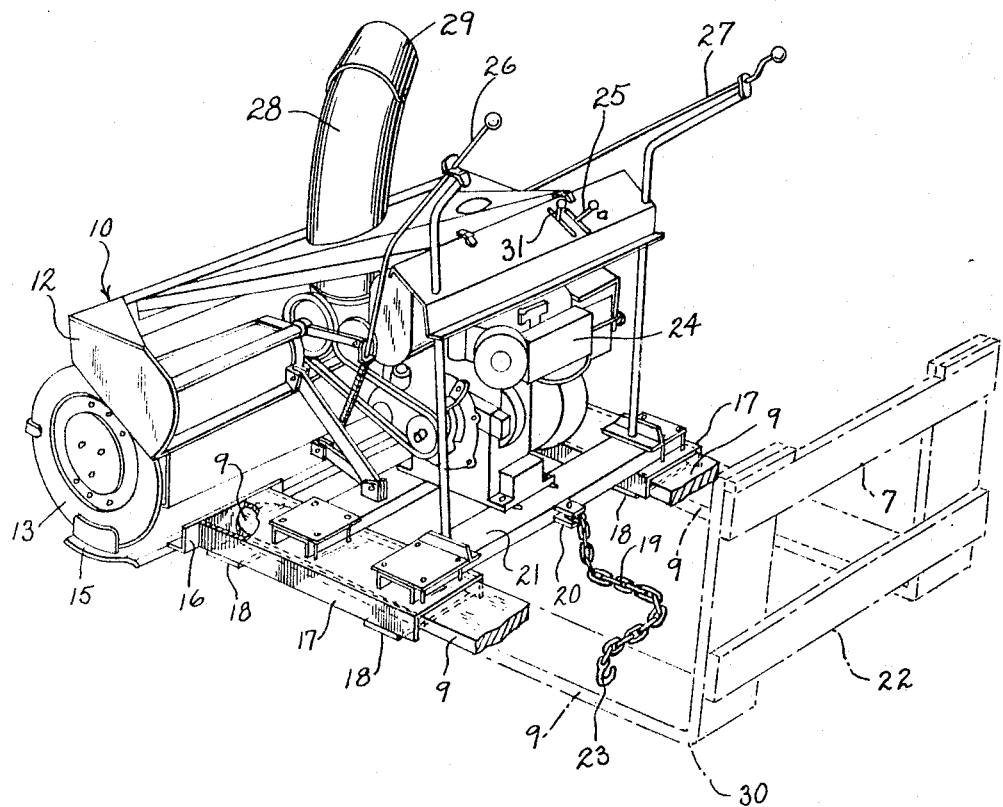

In the accompanying drawing in which the same reference characters indicate the same parts in all of the views:

FIG. 1 is a front and side perspective view of the improved snow thrower and fork lift truck assemblage; and FIG. 2 is a perspective view of the rear and opposite side of the snow thrower, with parts broken away and in section, showing the skid frame members of the snow thrower in telescopic engagement with the horizontal arms of a fork lift truck said fork lift truck arms being shown in broken lines.

Referring now more particularly to the drawings, it will appear from FIG. 1 that a standard wheeled fork lift truck, of a type well known in the art, is designated generally by the numeral 5. The fork lift truck may be powered by an internal combustion engine or an electric motor (not shown), which prime mover is, as is conventional, connected with the chains 6 or other elevating mechanism which operatively engage the vertical portion of a fork arm unit 7 so that the fork arm unit can be raised and lowered relative to a vertical mast 8 tiltably mounted at the front end of the truck 5. The fork arm unit 7 includes a pair of laterally spaced apart, horizontal, forwardly-projecting arms 9 of rectangular form in cross section.

A snow thrower is indicated generally by the numeral 10. Extending transversely across the front of the snow thrower is an auger 11 partially enclosed by a housing 12 from which depends header members 13 which cover opposite ends of the auger and which are connected by a transverse, horizontal protection bar 14. The lower peripheral portion of the headers 13 also carry skid shoes 15. Connected to rear portions of the skid shoes 15 are stop plates 16, to the vertical face portions of which are secured the inner ends of rearwardly-projecting, channeled arms 17 whose open, lower face portions are traversed by transverse bars 18 adjacent opposite ends of said channeled arms 17. The lateral spacing between the channeled arms 17 corresponds to the lateral spacing between the horizontal arms 9 of the fork arm unit of the truck 10 so that the free ends of the fork arms 9 may be telescopically slid into the channeled arms 17, as shown in FIGS. 1 and 2, when the snow thrower unit is to be connected to the fork lift truck. When the telescopic engagement is thus effected, the fork arms 9 are slid into the channeled arms 17 of the snow thrower until the free ends of the fork arms abut the stop plates 16 which close the inner ends of the channeled arms 17. Then the engagement is made secure by means of a chain 19 having one end permanently affixed to a clevis 20 carried by a transverse frame member 21 on the snow thrower, which chain is wrapped around one of the transverse bars 22 on the vertical portion of the fork unit with the free end of the chain, which carries a hook 23, being finally engaged with the clevis 20 so that the secured condition of the chain, as illustrated in FIG. 1, attains.

A snow thrower is provided with its own clutch controlled power plant 24 for operating the auger 11, and the power plant may be set into operation by manual manipulation of an ignition device 25. The numeral 26 designates the clutch control rod, and the numeral 27 designates the snow discharge control rod which is connected with the adjustable snow discharge spout 28, having on its outer end a manually-adjustable deflector 29.

As was previously mentioned, when the snow thrower is to be used it is quickly hitched with the fork arms 9 of the fork lift truck 5 to produce the assemblage of FIG. 1. With the power plant 24 of the snow thrower set into operation and its throttle 31 adjusted, and with the prime mover of the fork lift truck 5 operating, the assemblage is in condition to be driven along the surface which is to be cleaned of snow. The snow thrower operates in the usual manner, and in traversing the snow-covered surface it rides on the skid shoes 15 which are vertically adjustable. Snow is removed by the auger 11 and directed into the housing 12, from whence it is forcefully discharged through the spout 28 in the desired direction. The advance movement of the snow thrower is accomplished by the fact that it is forwardly pushed or propelled by means of the fork lift truck 5 to which it is attached, and during propulsion of the assemblage it is desirable that the heels or corner portions 30 of the fork arm unit 7 contact the ground or surface. This can be maintained by a proper angular tilt of the mast 8. By raising or lowering the fork arm unit 7 on the mast by means of the chains 6, the depth of bite into the snow can be regulated, and the angular adjustment of the mast 8 is also effective in providing the right balance for the snow-scraping operations.

The improved snow thrower and fork lift truck assemblage provides a very versatile and useful mechanism for factories and other industrial establishments and adds to the versatility of the fork lift truck. When the assemblage is required for snow removal purposes, the connection between the snow thrower and the fork lift truck is quickly effected, and the assemblage then can be used most efficiently for snow removal purposes, following which the snow thrower is detachable from the fork lift truck so that the latter may be restored to its normal realm of operations.

The snow thrower and fork lift truck assemblage, besides being versatile and economical, is simple and easy to operate and is, furthermore, well adapted for the purposes described.

What is claimed as the invention is:

1. In a snow thrower attachment for a fork lift truck wherein said attachment has an auger housing and has an auger rotatably mounted therein, elongated connection members connected to and projecting rearwardly from a lower portion of said auger housing adjacent the ground and having means for telescopically receiving the forks of a fork lift truck, said elongated connection members being so positioned as to be aligned with the forks of a lift truck when the latter are in a lowered position adjacent the ground, transverse frame means connecting said elongated connection members behind the auger housing, and means including a motor supported on said transverse frame means for driving said auger.

2. A snow thrower as claimed in claim 1 in which each of said elongated connection members includes an elongated downwardly facing channel for slidably and readily removably receiving a fork of the lift truck.

3. A snow thrower as claimed in claim 2 in which there is readily releasable retaining means engageable with the fork unit of the fork lift truck for maintaining the forks in fully inserted position in the channels.

4. A snow thrower as claimed in claim 1 in which each of said elongated connection members includes a downwardly facing channel with stop means at the end of each channel, and in which there is readily releasable retaining means for engagement with the fork unit of the fork lift truck to releasably maintain the forks in fully inserted position with their ends in substantial abutment with said stop means.

5. A snow thrower attachment as claimed in claim 1 in which said means for driving said auger includes a clutch and in which there is a long control member for said clutch projecting rearwardly from the attachment and having a manually manipulable laterally offset end positioned to be accessible at one side of a lift truck mast to an operator of such lift truck.

6. In combination, a fork lift truck having an upright mast and having a fork unit operable thereon and provided with forwardly projecting forks, a snow thrower attachment having a transversely extending front housing and having a snow removing element rotatably mounted therein, elongated channels adjustably connected to and projecting rearwardly from a lower portion of said housing close to the ground and telescopically receiving the forks of the fork lift truck, stops in said channels engaged by portions of the lift truck forks, and means releasably connecting the attachment to the fork unit of the lift truck to maintain the forks in fully inserted position in the channels.

7. In a material thrower attachment for a fork lift truck wherein said attachment has a housing and has a horizontal transverse shaft rotatably mounted in said housing and carrying elements which act on said material, elongated connection members connected to and projecting rearwardly from a lower portion of said housing adjacent the ground and having means for telescopically receiving the forks of a fork lift truck, said elongated connection members being so positioned as to be aligned with the forks of a fork lift truck when the latter are in a lowered position adjacent the ground, transverse frame means connecting said elongated connection members behind the housing, and means including a motor supported on said transverse frame means for driving said shaft.

References Cited by the Examiner

UNITED STATES PATENTS

| 2,390,286 | 12/1945 | Adams | 37—45 X |
|-----------|---------|----------|---------|
| 2,709,269 | 5/1955  | Williams | 37—43 X |
| 2,770,893 | 11/1956 | Jacobs   | 37—43   |
| 2,923,512 | 2/1960  | Campbell | 108—55  |
| 3,045,369 | 7/1962  | Howe     | 37—43   |

FOREIGN PATENTS 553,415 12/1956 Italy.

ANTONIO F. GUIDA, *Acting Primary Examiner.*

ABRAHAM G. STONE, *Examiner.*

R. L. HOLLISTER, *Assistant Examiner.*